(12) United States Patent
Tran et al.

(10) Patent No.: US 8,103,244 B2
(45) Date of Patent: Jan. 24, 2012

(54) SYSTEM AND METHOD FOR CONTROL OF TELEVISION USAGE

(75) Inventors: Dang Van Tran, Laguna Niguel, CA (US); Praveen Kashyap, Irvine, CA (US); Sun Ahn, Ladera Ranch, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 628 days.

(21) Appl. No.: 12/247,888

(22) Filed: Oct. 8, 2008

(65) Prior Publication Data

US 2010/0088620 A1  Apr. 8, 2010

(51) Int. Cl.
*H04M 11/00* (2006.01)

(52) U.S. Cl. ............................. 455/406; 706/47; 725/46

(58) Field of Classification Search ................ 725/46; 706/47; 455/406
See application file for complete search history.

(56) References Cited

U.S. PATENT DOCUMENTS

2009/0106797 A1*  4/2009  Lucente ......................... 725/46
2009/0276386 A1*  11/2009  Greening et al. ............... 706/47

* cited by examiner

*Primary Examiner* — William D Cumming
(74) *Attorney, Agent, or Firm* — Beyer Law Group LLP (57) ABSTRACT

Usage of televisions or other media devices is controlled, including controlling access to content on such devices. Access to multimedia content is controlled. Multimedia content to be accessed is identified, a viewer of the content is identified, data for the identified viewer that specifies a usage quota associated with the viewer and a usage rate associated with the viewer for the content is accessed, and the content to the viewer based on the usage quota and usage rate data is provided.

23 Claims, 8 Drawing Sheets

SYSTEM AND METHOD FOR CONTROL OF TELEVISION USAGE

BACKGROUND OF THE INVENTION

1. Field of the Invention

This application relates to control and interaction with televisions and other media playback devices.

2. Description of the Related Technology

Parental control systems provide a way of controlling access to content via particular televisions or other media playback devices. In particular, a parent or other head of household configures types of content to be blocked from viewing based on ratings or content indicators associated with content. Such indicators can be derived from the data associated with the content item or can be derived from electronic program guide data. However, such control systems tend to lack flexibility and granularity in control of viewed content. Accordingly, a need exists for improved access control for televisions and other media playback devices.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include view specific, flexible, and household wide access control to televisions and other media playback devices.

One embodiment comprises a method of controlling access to multimedia content. The method includes identifying multimedia content to be accessed, identifying a viewer of the content, accessing data for the identified viewer that specifies a usage quota associated with the viewer and a usage rate associated with the viewer for the content, and providing the content to the viewer based on the usage quote and usage rate data.

One embodiment comprises a system for controlling access to multimedia content. The system includes a memory configured to store usage quota and usage rate data associated with at least one viewer and at least one processor configured to: identify multimedia content to be accessed, identify a viewer of the content, access the data stored by the memory for the identified viewer that specifies a usage quota associated with the viewer and a usage rate associated with the viewer for the content, and provide the content to the viewer based on the usage quota and usage rate data.

One embodiment comprises a computer-program product for synchronizing broadcast video signals. The produce comprises a computer-readable medium having stored thereon codes executable by at least one processor to: identify multimedia content to be accessed, identify a viewer of the content, access data for the identified viewer that specifies a usage quota associated with the viewer and a usage rate associated with the viewer for the content, and, provide the content to the viewer based on the usage quota and usage rate data.

One embodiment comprises a system for controlling access to multimedia content. The system includes means for storing usage quota and usage rate data associated with at least one viewer and means for processing data. The processing means is configured to: identify multimedia content to be accessed, identify a viewer of the content, access the data stored by the memory for the identified viewer that specifies a usage quota associated with the viewer and a usage rate associated with the viewer for the content, and provide the content to the viewer based on the usage quota and usage rate data.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

As noted above, parental control systems such as those based on blocking access to multimedia content on televisions or other access devices may block content based on the channels, ratings of the content items, or simple rules based on other program guide data or description. However, such systems lack flexibility and granularity of control. Moreover, such systems only address complete blocking of access for users of the television. For example, a parent may wish to limit how much sports programming a particular child views even though such content is not blocked. Further, a parent may wish to limit how much of such limited content is viewed relative to other content such as educational programming.

Hence, one embodiment includes a system in which a parent or other supervising user controls access to multimedia content based on a usage credit or quota and usage rate system. For example, a parent may set a specified quota for a particular child along with a usage or "burn" rate for consuming that quota when the child views specified programming. When the child uses the television, content is blocked until the child identifies themselves via one of a number of methods, e.g., pressing a particular remote key or series of keys. The television then provides access to content based on the quota and usage rate data for that child. The quota and usage rate may be shared amongst all types of content or specific quota and/or usage rates may apply to different types of content. In one embodiment, the remaining quota for a viewer is updated periodically, e.g., after every minute, five minutes, fifteen minutes, etc. of viewing. In another embodiment, the usage quota for a particular viewer is updated at the end of a viewing session, at the end of a program, and/or when the type or classification of content on a channel or in within a particular program changes.

For example, in one embodiment, each viewer receives a single quota for which different usage rates apply depending on the type of content that is viewed. Alternatively, each viewer may have different amounts of quota for different types of content and, optionally, different usage rates applicable to each quota.

In one embodiment, the types of content are determined based on electronic program guide data. In one embodiment, a channel on which the content is available is used as a proxy for content, e.g., content on a sports channel may be categorized as "sports" regardless of whether electronic program guide data is available or if electronic program guide data is used.

In one embodiment, the quota and usage data are controlled per television or access device. In another embodiment, the quota and usage data are shared between two or more networked televisions or other access devices. In one embodiment, each device maintains a separate usage database and shares the data. In another embodiment, one of the devices is configured as a server for other devices. In another embodiment, a remote server (e.g., accessed via the internet or a cable head-end) maintains quota and usage data for all televisions in a household (which may be conceptual and include televisions located in the home and/or at the homes of friends and relatives). In one embodiment, parents or other users are thus able to control viewing habits of children or others with finer levels of control and more usefully for many types of users.

Figure 1:
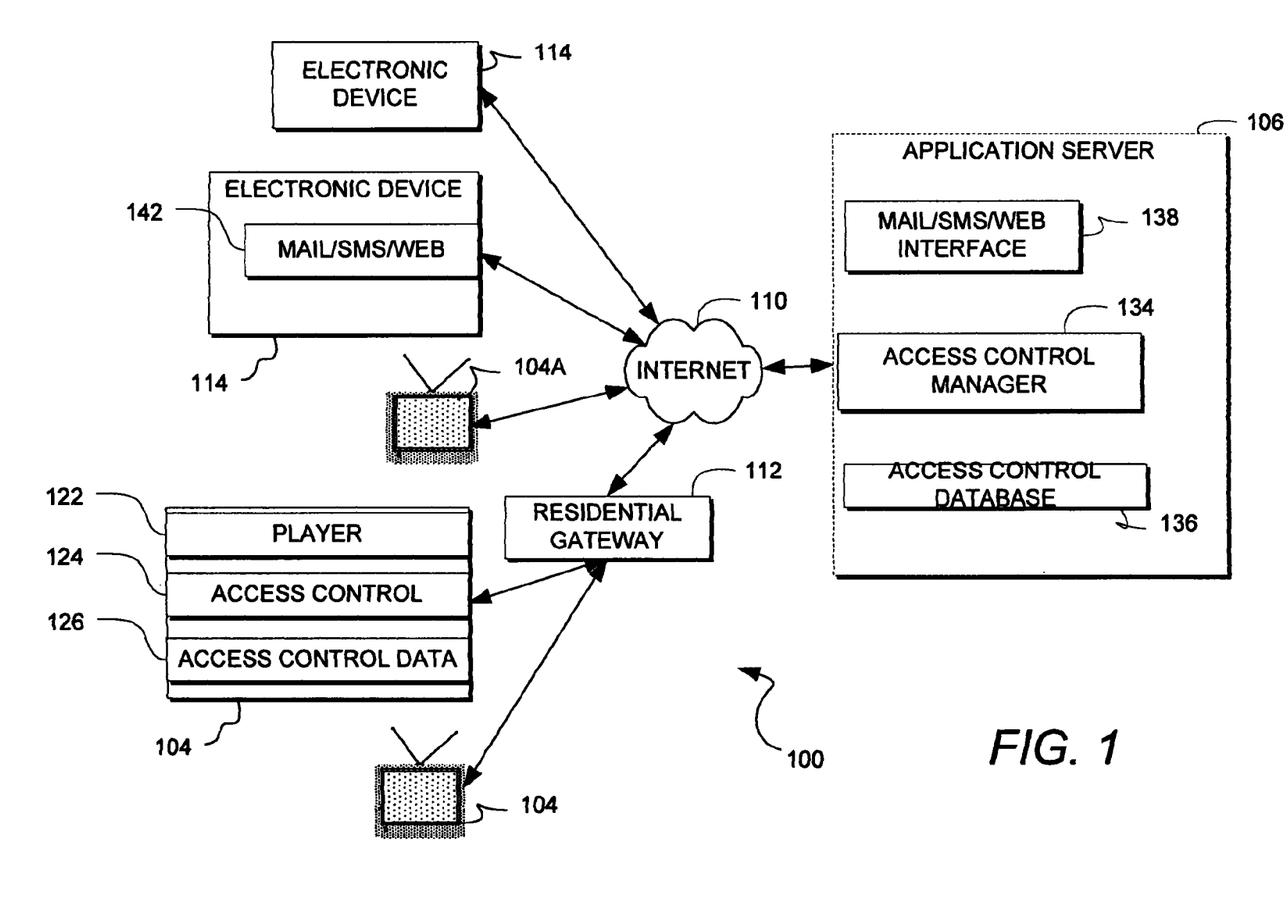
FIG. 1 is a block diagram illustrating components of one embodiment of a system for controlling usage of a television or other media access device.

As used herein "viewer" of multimedia content is a broad term that includes one who accesses multimedia content including one who views audio-video content, views video-only content, plays or accesses audio-only content, interacts with or plays a video game or other interactive program, or views or accesses any other multimedia content. "Multimedia content" as used herein refers to audio, video, or any other type of content. For example, multimedia content may include television or other video broadcast content, video or audio on-demand or downloaded content FIG. 1 is a block diagram illustrating components of one embodiment of a system 100 for controlling usage of such as a media access device or television 104. In one embodiment, the media access device 104 controls access to media based on a quota and usage rate that is determined based on the viewer and, optionally, the content. For example, each viewer is assigned a quota amount either manually or that is periodically refreshed. A usage rate, which may be dependent on the viewer and/or the content, is determined and the quota amount reduced over time as the viewer watches the selected content. When no more quota is available for the viewer, the viewer is prevented from accessing further content. Viewing of content in-progress may optionally be terminated once all quota is consumed.

Each television 104 may provide usage control independently. Alternatively, as illustrated in FIG. 1, a number of televisions 104 may provide usage control in coordinated fashion with other televisions 104. For example, in the system illustrated in FIG. 1, an application server 106 provides configuration and synchronization between several televisions 104. In FIG. 1, the application server 106 is a separate electronic device that coordinates usage control by the televisions 104 via a network 110, which may comprise the Internet. In other embodiments, the application server 106 may be integrated with one or more of the televisions 104. In one embodiment, one or more televisions 104 may communicate with the application server 106 (and via the network 110) via one or more routers such as a residential network gateway 112. The residential network gateway 112 may comprise one or more of an IP router, a cable modem, a DSL modem.

In one embodiment, configuration of the usage control may be performed via a user interface provided by the television 104. In other embodiments, the application server 106 may provide a configuration user interface, via the television 104, or via another electronic device 114 that is networked with the application server 106. Such electronic devices may include personal computers, mobile telephones, or any other suitable electronic device. In one embodiment, the electronic device may include the application server 106. For example, in one embodiment, the electronic device 114 is a personal computer that also provides the application server 106.

The television or other media access device 104 may include a player module 122 that is configured to output multimedia content under control of an access control module 124. The access control module 124 may in turn use access control data 126 from a database or other storage.

It is to be recognized that while certain embodiments are described herein with reference to the access device 104 comprising a television (e.g., a video monitor and broadcast television receiver), in other embodiments, the access device 104 may be embodied as one or more of a video monitor (e.g., without receivers), a cable or satellite set-top boxes, a digital video recorder (DVR), a video disc player (e.g., DVD or other format discs including high definition discs), a mobile telephone handset, or any other multimedia access device. Moreover, a particular system 100 may include any number and type of such access devices 104.

As discussed above, the application server 106 may be embodied as a server computer or distributed server computing system, as an electronic device such as a personal computer, or within a particular television 104. The application server 106 may include an access control manager 134 that provides and maintains usage control data via an access control database 136. The application server 106 may communicate via the network 110 with one or more televisions 104 to provide usage control data. In one embodiment, the application server 106 communicates with the televisions 104 to request synchronization when the application server 106 receives and stores updated control data. In another embodiment, the televisions 104 request updated data in response to viewer requests for access to content. In one embodiment, the application server 106 does not include the access control database 136, but rather the access control manager 134 coordinates and maintains the access control data 126 of each television 104.

In operation, the access control manager 134 receives usage data from televisions 104 based on viewer usage on those devices and updates one or both of the access control database 136 or synchronizes access control data 126 of each television 104. The application control manager 134 may also update and replenish quotas. For example, in one embodiment, each viewer may configured to receive additional quota amounts via a periodic (e.g., daily, weekly, etc) replenishment at a specified replenishment rate. In another embodiment, quota amounts are received via manual update to the database via a user interface provided for parents or other system managers. In another embodiment, quota amounts for each viewer may be updated both manually and via periodic replenishment. Each viewer may have a specific replenishment rate and/or a default or global replenishment rate may be used.

The application server 106 may further include a user interface module 138 that provides an e-mail, short message system (SMS), or web (e.g., HTML via HTTP) interface for maintaining the access control database 136. In one embodiment, the user interface module 138 is further configured to provide managing users (e.g., parents) with usage reports either when requested or periodically (such as via a periodic email). The application server 138 may maintain user data based on an account, which in one embodiment is tied to an email or other identifier. The managing user of the account may add televisions 104 to the account using a serial number associated with the television 104 or by accessing the server 106 from a particular television that can automatically provide identifying information such as a serial number while accessing the application server 106.

The electronic device 114 may include a memory, processor, storage, a display, and one or more user input devices to provided a user interface configured to configure and maintain access control data with the application server 106. In one embodiment, the electronic device 114 includes a web browser, e-mail client, SMS client, or other application 142 that is configured to communicate with the application server 106 to configure access control data. In one embodiment, the electronic device 114 communicates with the application server via the network 110. In another embodiment, the electronic device 114 includes the application server 106. In another embodiment, the electronic device communicates configuration information with the application server 106 which is provided by one of the televisions 104.

Figure 2A:
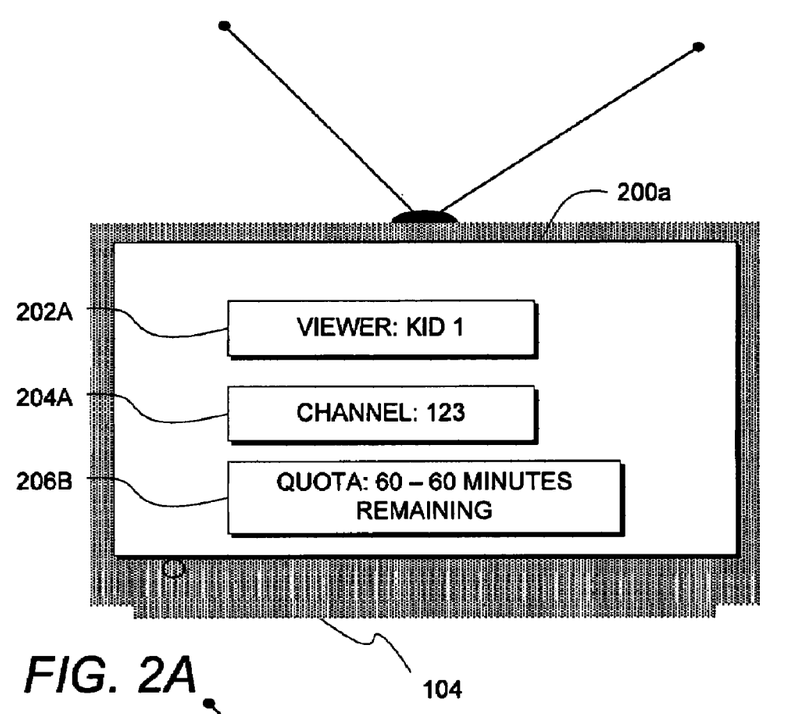
FIGS. 2A and 2B illustrate an example of a user interface displaying usage control information for use in connection with the system of FIG. 1.
Figure 2B:
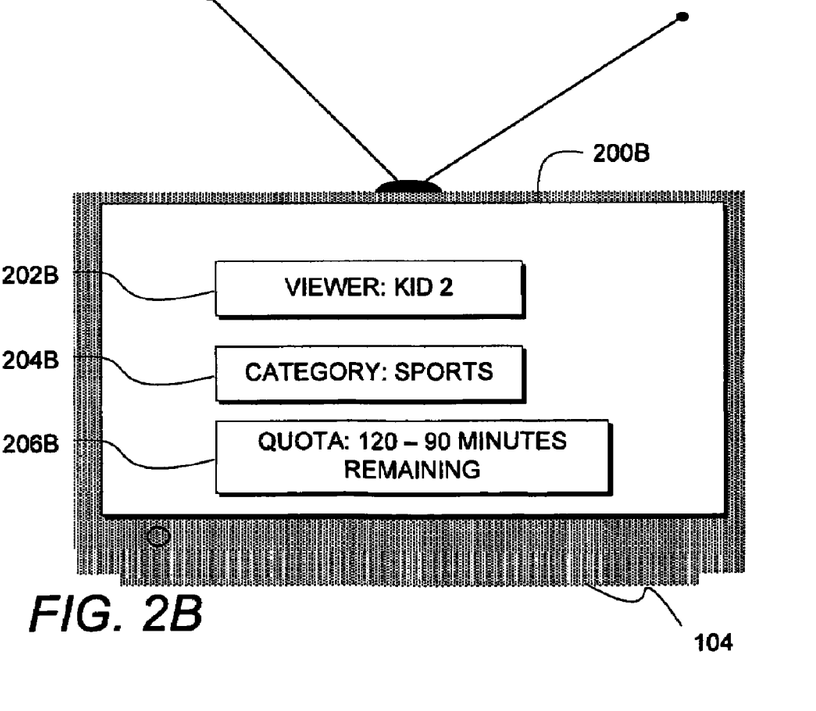

FIGS. 2A and 2B illustrate examples of a user interface (interfaces 200A and 200B, respectively) displaying usage control information for use in connection with the system 100. In FIG. 2A, upon being activated or tuned to a particular channel by a viewer identified as "KID 1" in a field 202A, the television 104 determines that the viewer may access the specified content, here identified in a field 204A as a channel "123," and provide further information in the form of the quota amounts remaining for the viewer and the usage rate associated with the selected content. Similarly, FIG. 2B illustrates another example in which a filed 202B indicates the viewer is "KID 2," the specified content, a "sports" program, is indicated in a field 204B, and the quota amounts and time at the usage rate for such programs is indicated in a field 206B. It is to be recognized that while such information is provided upon accessing content according to one embodiment, that such an informational display is optional. Further, in one embodiment, such an information display may be provided on demand (e.g., via the viewer pressing a specified remote control key) or periodically as usage continues, or as a warning a specified time before quota amounts are all used.

Further, while FIGS. 2A and 2B illustrate display of usage data via the television 104 via the access control 124, in one embodiment such data may be provided via a web or other interface 138 of the application server 106.

Figure 3:
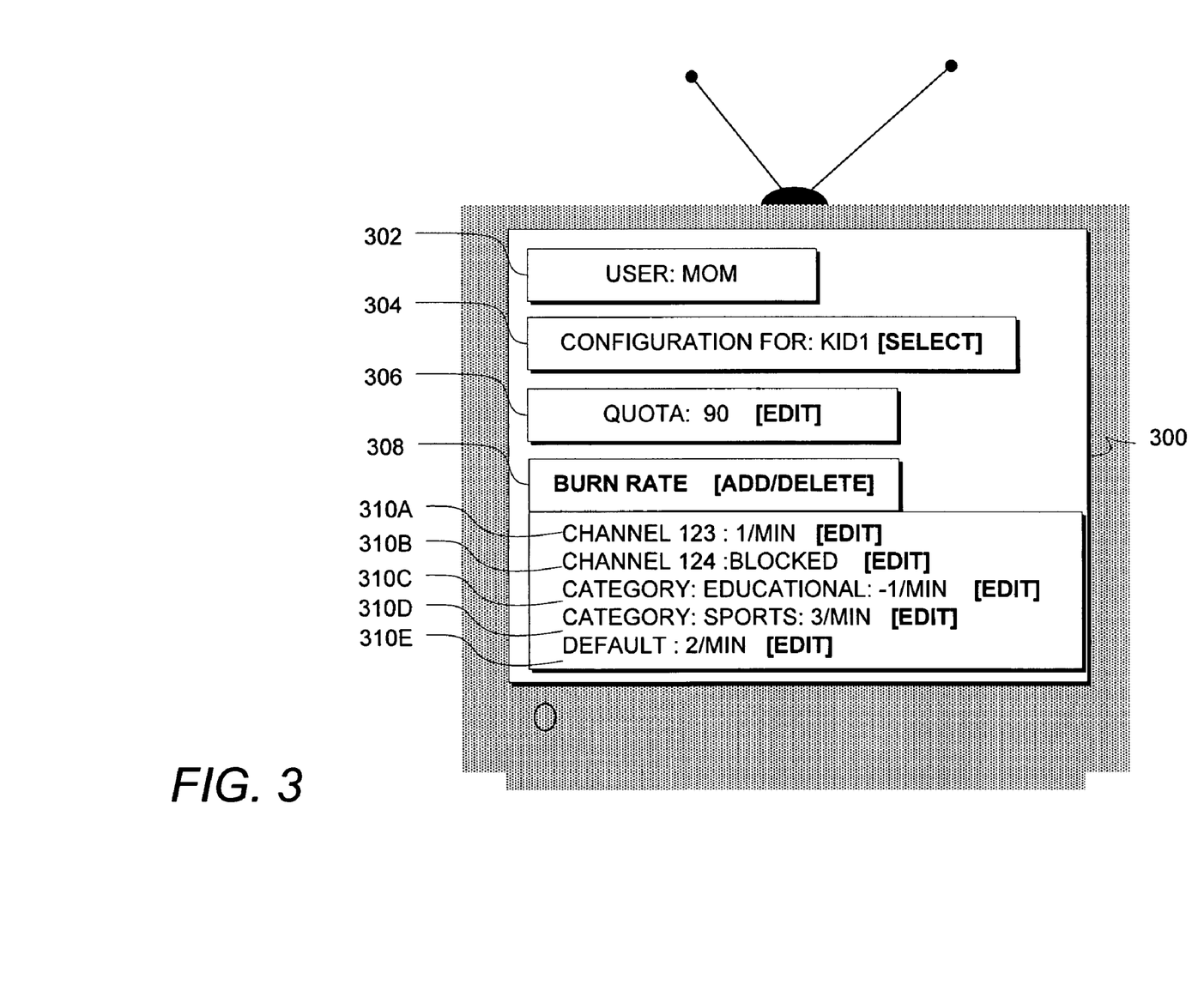
FIG. 3 illustrates an example of a user interface for configuring usage control information for use in connection with the system of FIG. 1.

FIG. 3 illustrates an example of a user interface 300 for configuring usage control information for use in connection with the system 100. In particular, FIG. 3 illustrates a user interface provided via the television 104. However, such an interface may, in some embodiments, also be provided via the electronic device 114 using the mail/SMS/web interface 142 of the electronic device 114. A parent or other supervising user may use an interface such as the example illustrated in FIG. 3 to configure usage quota and usage rate information for viewers of the particular television or, in one embodiment, of viewers of any other television or other viewing device in communication with (directly or indirectly via communication with the application server 106) the particular television 104 or electronic device 114. An interface field 302 indicates identify of the user for whom the interface is provided. An interface field 304 indicates which viewer for whom the configuration applies, and optionally, provides a control for selecting a different viewer. A field 306 indicates quota amounts for the selected viewer. In the illustrated example, quota amounts apply to all types of content. In other embodiments, quota amounts can be configured on a per content basis. In addition to setting a specific amount of quota for the selected viewer, in one embodiment, the user interface may further include a field (not shown) for configuring an automatic rate of usage quota replenishment so that viewers automatically receive additional quota amounts over time, e.g., at a specified rate per day.

A field 308 provides usage or burn rate control. A control optionally associated with the field 308 allows addition or deletion of controlled categories of viewing content. In one embodiment, usage control for a particular viewer only applies to the specified types of content and access to other types of content are allowed without application to usage control, e.g., default to allowing access. In another embodiment, a viewer may access only the types of content specified along with specified usage rate and all other types of content are blocked, e.g., default to blocking access. In yet another embodiment, the configuration data of each user may specify access control for types of content that are not enumerated in the configuration data, e.g., a per user default.

The interface 300 may include one or more fields 310 that specify types (e.g., by source channel, category, or a default) of content along with usage rates for such content. The fields 310 may farther include controls for allowing the user to change the values of the fields 310. In the illustrated example, a field 310A illustrates a per minute usage rate for content from a channel 123 and a field 310D illustrates a per minute usage rate for category sports. A field 310B illustrates blocking of content from a particular channel 124 entirely. A field 310C illustrates that usage rate of certain types of content may be set to a negative value so that the viewer actually earns more quota amounts by watching such content. A field 310E illustrates a field for setting a default burn rate when the content does not match any other specified type of content.

In one embodiment, the interface 300 may be generated by the mail/SMS/web interface module 138 of the application server 106. User responses to the interface module 138 are processed by the interface module 138 and the data provided to the access control manager 134 and/or stored in the access control database 136. In another embodiment, the access control module 124 of each television 104 may generate and control the interface 300 to update the access control data 126 or to provide such data to the application server 106.

Figure 4:
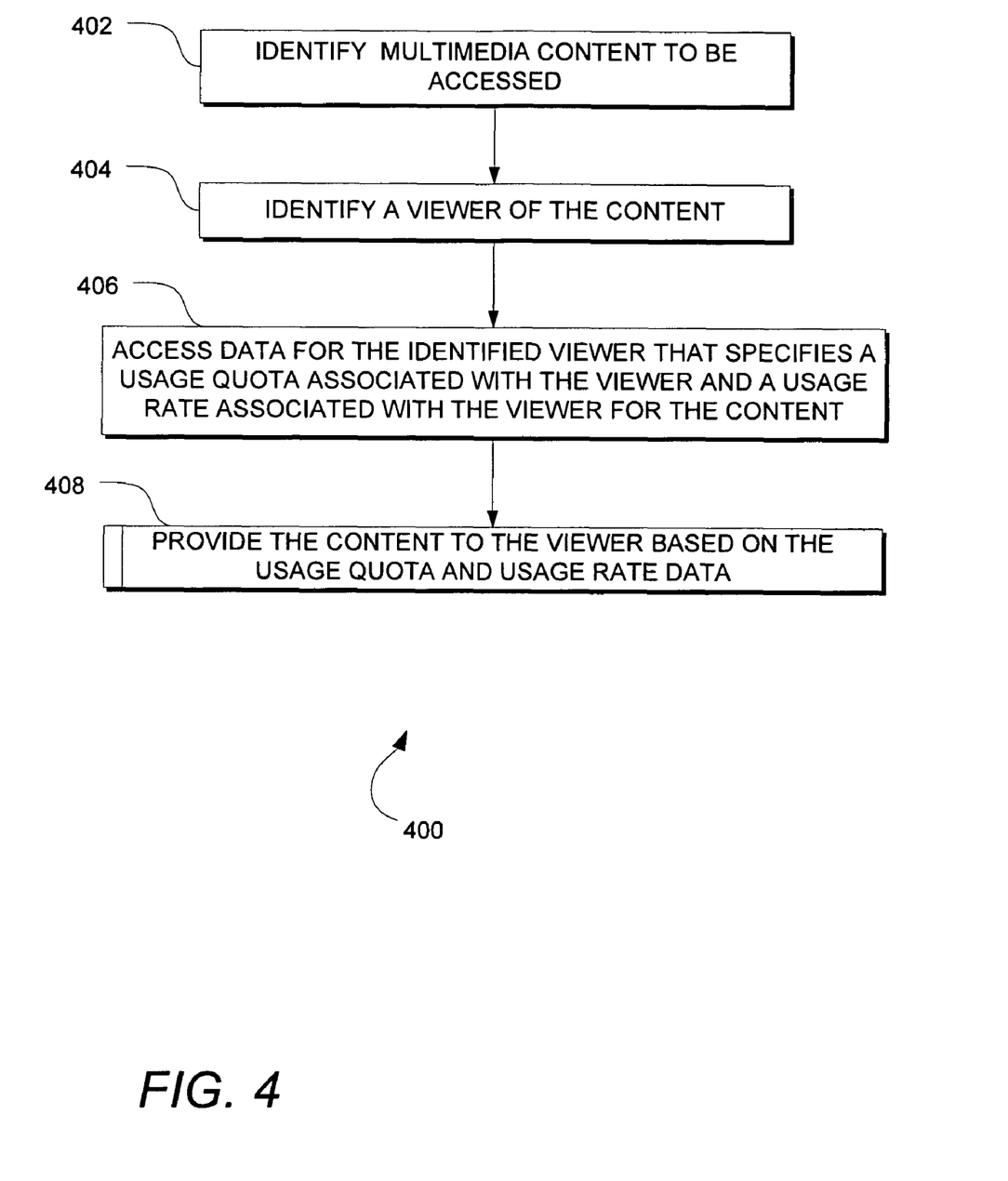
FIG. 4 is a flowchart illustrating one embodiment of a method of controlling access to television or other media access device such as in the system of FIG. 1.

FIG. 4 is a flowchart illustrating one embodiment of a method 400 of controlling access to television or other media access device such as in the system 100. The method begins at a block 402 in which the television 104 identifies multimedia content to be accessed. The identification may include identifying a type associated with the content. The type may be a broadcast or other channel on which the content is accessed, a rating associated with the content, or a category associated with the content. Types such as ratings or category may be derived from data provided with the content or from electronic program guide data accessed via the television 104 from broadcasts, a cable or satellite head-end, or via download from any suitable guide data source.

Next at a block 404, the television 104 identifies a viewer of the content. In one embodiment, the viewer manually identifies themselves via pressing a particular button or series of buttons (e.g., as a password) on a control or remote control of the television 104. In one embodiment, the television 104 includes a remote control with color labels that are assigned to each viewer of the television 104. In one embodiment, when content is accessed, if no viewer has been identified, the television 104 may block access until identification is received from a viewer. In embodiments in which the user identifies themselves with a series of buttons, the series may include numeric buttons, pictorial buttons, or from buttons associated with any set of remote commands. In response to identifying the viewer, the television 104 may optionally display an icon (e.g., in the color associated with the viewer, or an icon or graphic associated with the viewer) for at least a specified period after identification of the viewer to confirm that the identity of the viewer.

In one embodiment, identification of viewers can be performed based on use of a specific remote control associated with each user. In one embodiment, viewer identification may be performed automatically based on the television 104 detecting proximity to a device such as an RFID or Bluetooth device incorporated in a keychain, jewelry, or a mobile telephone handset. In another embodiment, the television 104 may include a camera or other sensor for detecting presence of viewers. In one such embodiment, simple facial recognition may be used. In another embodiment, rather than receiving input via a remote control device, gesture recognition may be used to receive input from, and identify, the viewer.

If multiple viewers are concurrently identified, the television 104 may be configured to operate in a number of different ways. For example, the television 104 may be configured to provide the selected content only if all identified users have sufficient quota amounts (and to update quota amounts for all identified viewers). Alternatively, the television 104 can provide access based on the first identified viewer. In yet another embodiment, the television 104 can provide access based on the most recently identified viewer. In one such embodiment, the television can reinitiate the method 400 upon access by a newly identified viewer at any time.

Moving to a block 406, the television 104 accesses data for the identified viewer that specifies a usage quota associated with the viewer and a usage rate associated with the viewer and for the content. In various embodiments, the usage quota can be global for the user over all types of content or can be specific to different types of content. Similarly, the same usage rate may apply to all types of content or vary depending on the type of content. The television 104 may access the data stored on a storage (e.g., a flash memory or disk memory) of the television 104 or access the data via network from the application server 106.

Proceeding to a block 408, the television 104 provides the content to the viewer based on the usage quota and usage rate data. The television 104 may time usage for the viewer and update the usage quota data for that viewer accordingly. In one embodiment, the television 104 performs the method 400 at the start of each new program or when the channel is changed to access different programming.

Figure 5:
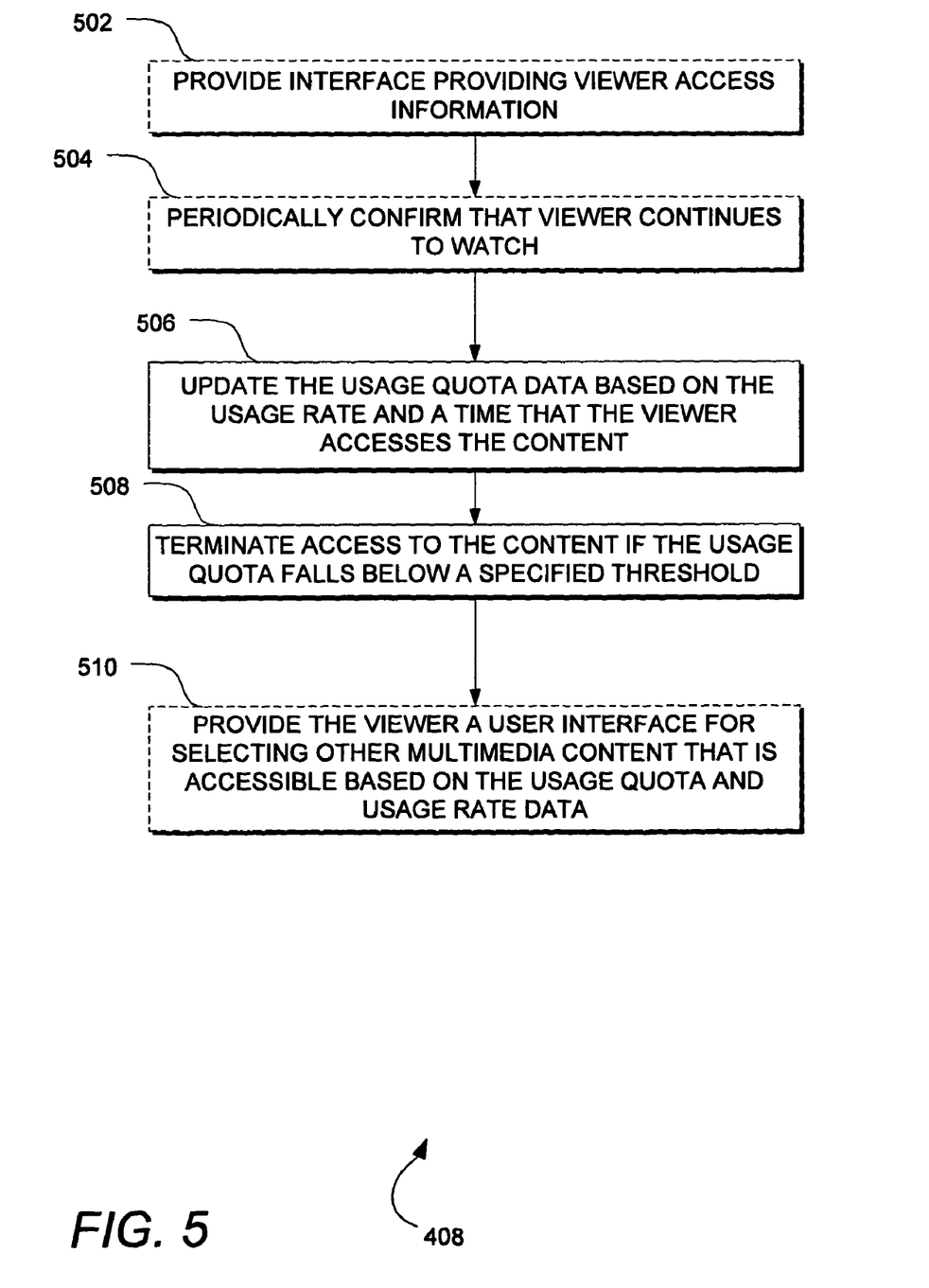
FIG. 5 is a flowchart illustrating in more detail portions of one embodiment of the method illustrated in FIG. 4.

FIG. 5 is a flowchart illustrating in more detail acts and events associated with the block 408 of the method 400 illustrated in FIG. 4. For example, at an optional block 502, the television 104 provides an interface providing viewer access information such as illustrated in FIGS. 2A and 2B. Such an interface may be provided for a specified short period of time upon accessing the content or upon request of the viewer.

Moving to an optional block 504, the television 104 may periodically confirm that the identified viewer continues to watch the requested content. In one embodiment, a user interface including text or graphics may be periodically displayed to request that the viewer confirms that they are still watching. Such a mechanism can be provided to prevent the user from losing their quota amounts for forgetting to turn off the television 104 or otherwise ending their viewing before the end of the selected content. If the viewer fails to confirm that they are still viewing, the television 104 terminates access to the content.

For example, in one embodiment, each viewer may be associated with a shape or color. When the television 104 confirms that the viewer is present a small icon in the shape or color associated with the viewer may be displayed or flashed for as specified period to prompt the user to enter their identifier. In one embodiment, the shape or color corresponds to a icon, shape, or color associated with a button of a remote control of the television 104 that the viewer can press to provide identity or to confirm continued viewing.

Next at a block 506, the television 104 continuously or periodically updates the usage quota data for the viewer based on the usage rate and a time that the viewer has accessed the content until the end of the selected content or the content/channel specified for the television is changed (by the identified viewer or another viewer). The updating can be performed with respect to the control data 126 of the specific television 104 and/or the updated data shared with other televisions 104 or with the application server 106.

Moving to a block 508, the television 104 terminates access to the content if/when the usage quota of the viewer falls below a specified threshold (e.g., 0 usage quota remains). In one embodiment, the user may provided a warning prior to starting the viewing of the content if the viewer has insufficient quota to view selected content at the specified usage rate. In one embodiment, a grace period may be provided so that the viewer may continue the selected content until its end. The grace period may be a specified time period or may include the remainder of selected content for which any quota amounts remained upon initially accessing. In one embodiment, negative quota amounts may be accrued as a result of such viewing. The amount or existence of such a grace period may be configured via an interface such as the configuration interface 300.

Proceeding to a block 510, if access to selected content is denied or terminated for a viewer, in one embodiment, the television 104 may provide the viewer a user interface for selecting other content that is accessible based on the quota and usage rate data of the viewer. In one embodiment, such content is identified using an electronic program guide.

Figure 6:
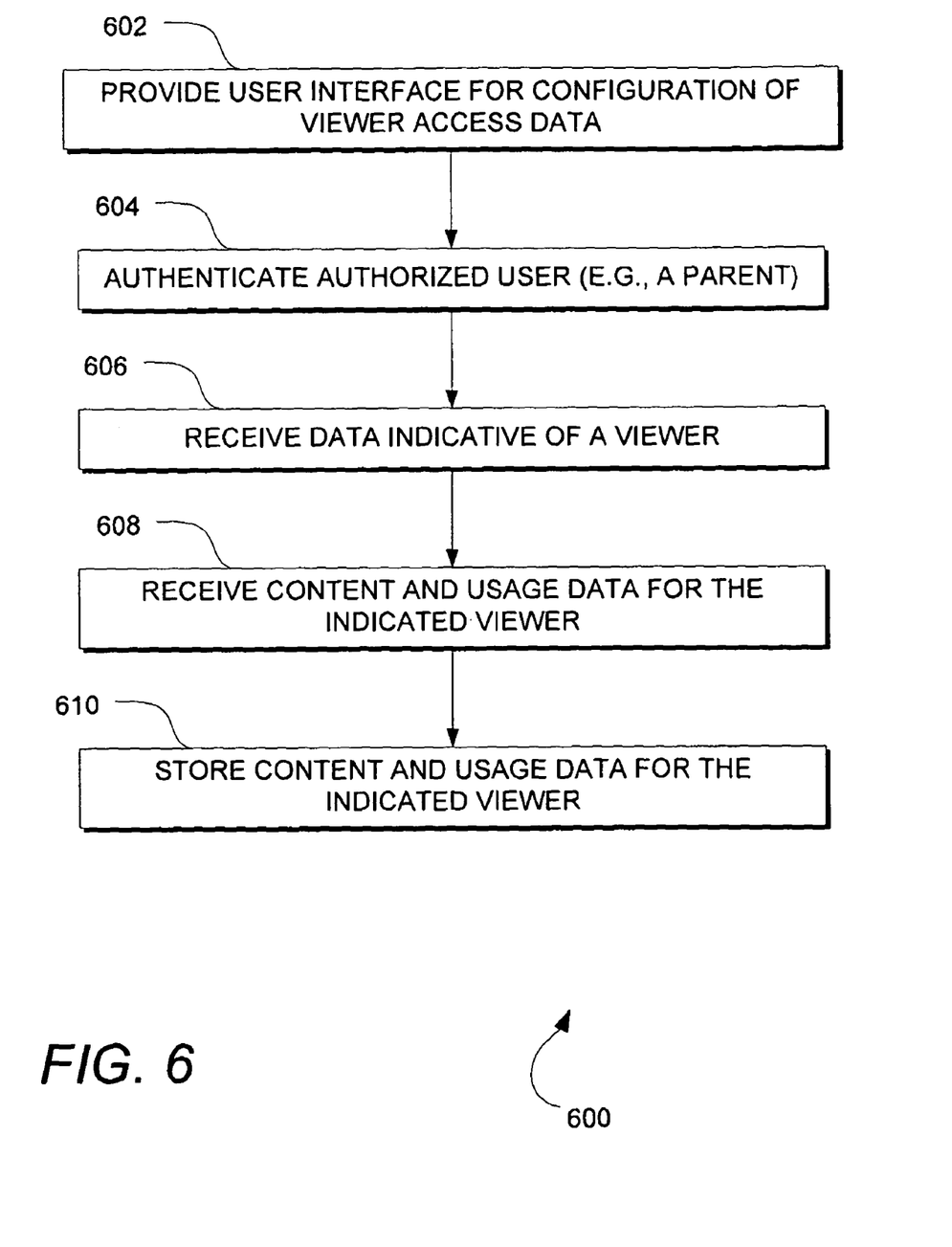
FIG. 6 is a flowchart illustrating one embodiment of a method of configuring usage control in a system such as illustrated in FIG. 1.

FIG. 6 is a flowchart illustrating one embodiment of a method 600 of configuring usage control in the system 100. The method 600 begins at a block 602 in which the system 100 provides a user interface (such as illustrated in FIG. 3) for configuration of viewer access data. In one embodiment, the television 104 includes the application server 106 and provides the user interface. Alternatively, or in addition, the application server 106 may provide the user interface via an e-mail, SMS, or web interface to the television 104 or other electronic devices 114. Next at a block 604, the application server 106 authenticates the user via a password or other suitable mechanism. In response, a suitable user interface such as illustrated in FIG. 3 may be provided to the authenticated user.

Moving to a block 606, the application server 106 receives data indicative of a particular viewer whose usage is to be configured from the user interface. Next at a block 608, the application server 106 receives content and usage data for the indicated viewer upon entry by the authenticated user. Proceeding to a block 610, the application server 106 stores the content and usage data for the indicated user. As noted above, in one embodiment, the application server 106 may synchronize the updated data with one or more televisions 104 or provide the updated data when requested by the televisions 104.

Figure 7:
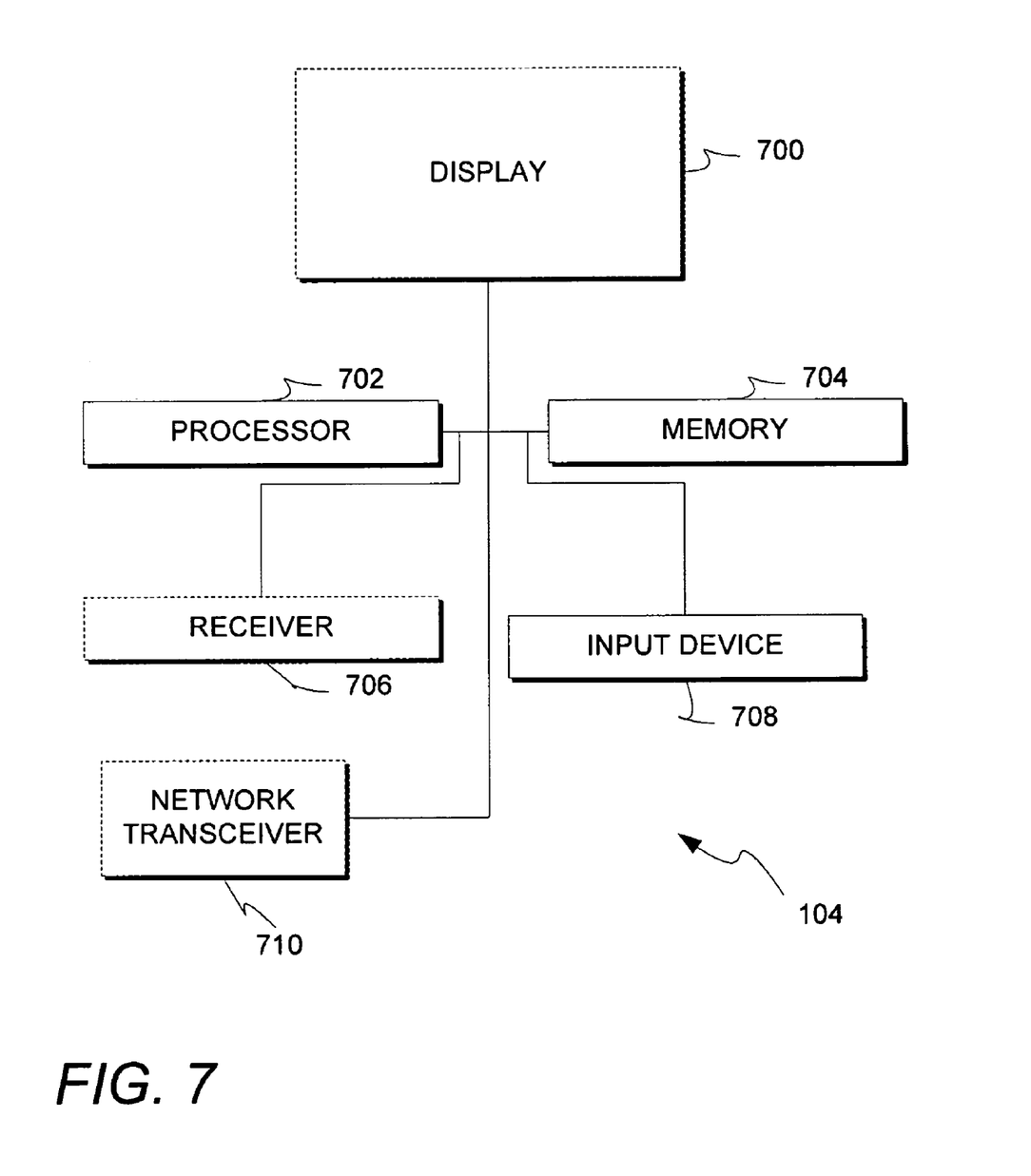
FIG. 7 is a block diagram illustrating components of one embodiment of a television or other media access device such as illustrated in FIG. 1.

FIG. 7 is a block diagram illustrating components of one embodiment of a television or other media access device 104 of the system 100. The access device 104 may optionally include a display 700 (e.g., when embodied in a television). A processor 702 may communicate with the display 700 and a memory 704, a receiver 706, an input device 708 such as a front panel control or a remote control, and optionally with a network transceiver 710 for communicating with other access devices 104, the application server 106, or electronic devices 114. The processor 702 may be configured to perform the various functions associated with the television or other device 104. In one embodiment, the memory 704 includes an instruction storage medium having instructions (or data indicative of such instructions where the instructions are stored in compressed or encrypted form) that causes the processor 702 to the perform functions associated with the device 104. In addition, or instead of the control device 708, the television 104 may implement any other suitable input mechanism including those discussed above with reference to identifying a viewer. The network transceiver 710 may comprise any suitable network interface such as wired or wireless Ethernet and be configured to communicate with the application server 106 via the network 110.

Figure 8:
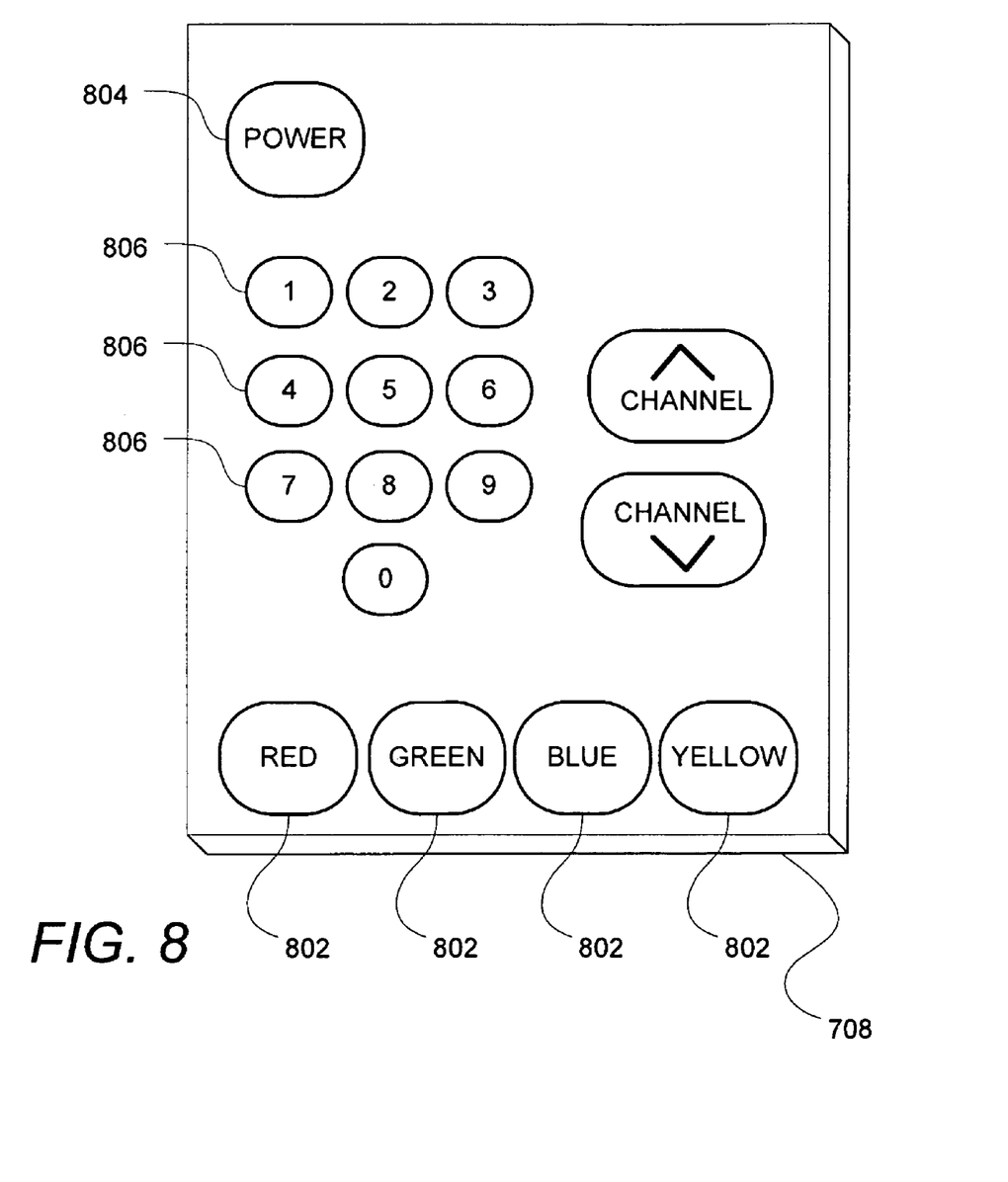
FIG. 8 is a front view of one embodiment of a control device such as used to control the device illustrated in FIG. 7.

FIG. 8 is a front view of one embodiment of the device 708 such as used to control the device 104. In addition to basic control buttons 804 for functions such as power on/off, and channel changing buttons 806, the control 708 may include buttons that may be configured to identify viewers of the television 104. For example, color buttons 802 may be provided on the control to provide either a simple one-color identifier or a color based "password" of multiple colors. Alternatively, numeric buttons 806 (or alphanumeric buttons (not shown) may be used to enter a viewer password/identifier or to enter a management interface such as illustrated in FIG. 3.

In view of the above, one will appreciate that the invention overcomes the problem of providing usage control of a television or other media access device. For example, embodiments include a quota based system for providing per viewer access control.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of controlling access to multimedia content, the method comprising:
  identifying multimedia content to be accessed;
  identifying a viewer of the content;
  accessing a first data for the identified viewer that specifies a usage quota associated with the viewer and a usage rate associated with the viewer for the content;
  receiving a second data indicative of at least one of usage quota data and usage rate data for the viewer from a supervising user via a user interface;
  updating the at least one of the usage quota and the usage rate of the viewer based on the received second data; and
  providing the content to the viewer based on the usage quota and usage rate data.

2. The method of claim 1, wherein providing the content to the viewer based on the usage quota and usage rate data comprises updating the usage quota data based on the usage rate and a time that the viewer accesses the content.

3. The method of claim 2, wherein providing the content to the viewer based on the usage quota and usage rate data comprises terminating access to the content when the usage quota falls below a specified threshold.

4. The method of claim 3, further comprising providing a user interface for selecting other multimedia content that is accessible based on the usage quota and usage rate data.

5. The method of claim 1, wherein the usage rate is based on at least one of a classification associated with the content, a title of the content, electronic program guide data indicative of the content, or a channel on which the content is accessed.

6. The method of claim 5, wherein the channel is one of a broadcast channel or an on-demand channel.

7. The method of claim 1, wherein the usage rate is based on at least one of a time of day when the content is accessed, or a day of the week when the content is accessed.

8. The method of claim 1, wherein the usage rate is based on at least one of an identity of a device or location of the device on which the content is accessed.

9. The method of claim 1, wherein providing the content to the viewer comprises at least one of displaying a video broadcast, displaying a recording of a video broadcast, displaying previously downloaded video content, displaying video on-demand content, playing audio content, and providing access to an interactive electronic game.

10. The method of claim 1, further comprising updating at least one of the usage quota and usage rate of the viewer based on input received from a user interface provided to a supervising user.

11. The method of claim 10, wherein the updating comprises:
   receiving authentication data of the supervising user via the user interface;
   authenticating the supervising user based on the authentication data.

12. The method of claim 11, further comprising providing the user interface.

13. The method of claim 12, wherein the user interface comprises a web page.

14. The method of claim 1, further comprising updating the usage quota data periodically based on a replenishment rate.

15. The method of claim 1, further comprising periodically requesting confirmation that the viewer continues to access the content.

16. The method of claim 1, wherein the confirmation comprises receiving user input indicative of the identity of the viewer.

17. The method of claim 1, wherein identifying the viewer comprises receiving input from the viewer indicative of the identity of the viewer.

18. The method of claim 17, wherein the input comprises a signal associated with a press of a specified button of a remote control.

19. The method of claim 17, wherein the input comprises a password.

20. The method of claim 1, wherein accessing data for the identified viewer comprises accessing data via a network.

21. The method of claim 20, wherein the content is provided via a first media device and wherein accessing the data via a network comprises accessing the data stored on a second media device.

22. The method of claim 20, wherein the content is provided via a first media device and wherein accessing the data via a network comprises accessing the data stored on a server accessed at least in part via the Internet.

23. A non-transitory computer-program product for synchronizing broadcast video signal, the product comprising:
   a computer-readable medium having stored thereon codes executable by at least one processor to:
      identify multimedia content to be accessed;
      identify a viewer of the content;
      access a first data for the identified viewer that specifies a usage quota associated with the viewer and a usage rate associated with the viewer for the content;
      receiving a second data indicative of at least one of usage quota data and usage rate data for the viewer from a supervising user via a user interface;
      updating the at least one of the usage Quota and the usage rate of the viewer based on the received second data; and
      provide the content to the viewer based on the usage quota and usage rate data.

* * * * *